United States Patent [19]

Ishimaru et al.

[11] Patent Number: 5,793,736
[45] Date of Patent: Aug. 11, 1998

[54] OPTICAL INFORMATION RECORDING AND REPRODUCING CONTROL APPARATUS AND CONTROL METHOD OF THE SAME

[75] Inventors: Masahiko Ishimaru, Odawara; Tsuyoshi Toda, Kodaira, both of Japan

[73] Assignee: Hitachi, Ltd., Tokyo, Japan

[21] Appl. No.: 661,635

[22] Filed: Jun. 11, 1996

[30] Foreign Application Priority Data

Jun. 14, 1995 [JP] Japan .................... 7-146995

[51] Int. Cl.$^6$ .................................... G11B 7/125
[52] U.S. Cl. .................................... 369/116; 369/54
[58] Field of Search .................... 369/116, 54, 58, 369/106, 111, 124, 13

[56] References Cited

U.S. PATENT DOCUMENTS 5,059,780  10/1991  Kakuta et al. ............... 369/116
5,590,111  12/1996  Kirino et al. ................ 369/116

FOREIGN PATENT DOCUMENTS 5-159340  6/1993  Japan .
6-325399  11/1994  Japan .................... G11B 7/125

OTHER PUBLICATIONS

"Optical Disk Technique", Onoue et al, published by Radio Technique Company, Jul. 20, 1992, pp. 40–42.

*Primary Examiner*—Tod R. Swann
*Assistant Examiner*—Kim-Kwok Chu
*Attorney, Agent, or Firm*—Fay, Sharpe, Beall, Fagan, Minnich & McKee

[57] ABSTRACT

A recording/reproducing apparatus includes a laser for generating laser light to be used for recording/reproducing information onto/from a recording medium, a beam splitter for separating a luminous flux for a monitor, a photodetector for receiving the luminous flux, a power control circuit for keeping an average output of the laser at a predetermined value, a high-frequency adding circuit for applying high-frequency modulation to the laser, and a controller for altering the degree of modulation of the high-frequency modulation. When the average output of the laser is kept constant by the power control circuit, the degree of modulation conducted by the high-frequency adding circuit is altered, the light emitting power (bottom power) subjected to no high-frequency modulation being thus controlled.

13 Claims, 5 Drawing Sheets

OPTICAL INFORMATION RECORDING AND REPRODUCING CONTROL APPARATUS AND CONTROL METHOD OF THE SAME

BACKGROUND OF THE INVENTION

1. field of the Invention

The present invention relates to optical disk apparatuses, and in particular to optical disk apparatuses using rewritable optical disks as recording media.

2. Description of the Related Art

As for optical disk apparatuses, there has been conventionally known a technique of applying high-frequency modulation to reproduced light at the time of information reproduction to keep the average power thereof constant. This technique aims at reducing the influence of return light noise of a semiconductor laser functioning as a light source. This technique is described in "Optical Disk Technique," written by Morio Onoe et al., and published by Radio Technique Company in Jul. 20, 1992 as the second impression of the second edition, pp. 40–42, for example. On the other hand, higher power is needed at the time of recording than the time of reproducing. The necessary recording power must be added to the reproducing power. If the recording power is generated as light in the high-frequency modulated state, then the high-frequency modulation component is added to the necessary recording power level, and the recording power becomes unstable. At the time of recording, therefore, trial writing is carried out in such a state that high-frequency modulation is not conducted, and recording is conducted by adding the derived recording power.

In the case where the above described conventional technique is used and direct current light emission is conducted in the laser without conducting high-frequency modulation, the light emission power becomes unstable under the influence of return light noise caused by return of light reflected by a medium to the laser. The light emission power (hereafter referred to as bottom power) at that time varies from laser to laser and depending upon the quantity of return light caused by the difference in reflectance among media. Therefore, the light emission power varies depending upon the optical disk apparatus in use and the inserted medium. Furthermore, only power added to the bottom power is determined in trial writing. Therefore, the power level at the time of recording is directly influenced by the variation of the bottom power.

As the density of the medium becomes higher, however, spaces between recording marks become short. When the bottom power level has become high, therefore, the power level of the pause interval between recording of one mark and recording of the next mark becomes high. The thermal influence between recording marks thus appears significantly. As a result, edge control of recording masks becomes difficult.

As a technique for controlling the above described variation of the recording/reproducing power caused by the return light, there is a technique disclosed in JP-A-5-159340, for example. However, this technique aims always at deriving constant recording/reproducing power by applying a correction to the feedback system of the monitor signal according to the variation value of the light monitor signal which varies between before and after focusing. Therefore, this technique does not correct variation of light emission power caused by incidence of the return light upon the laser.

SUMMARY OF THE INVENTION

An object of the present invention is to provide an optical disk apparatus and a control method thereof capable of suppressing the dispersion of the edge shape and arrangement pitch of recording marks caused by variation of the bottom power and capable of recording information on an optical disk medium with high density.

In accordance with the present invention, a recording/reproducing apparatus includes a laser for generating laser light to be used for recording/reproducing information onto/from a recording medium, a power control circuit for keeping an average output of the laser constant, a high-frequency adding circuit for applying high-frequency modulation to the laser, and a controller for altering the degree of modulation of the high-frequency modulation. When the average output of the laser is kept constant by the power control circuit, the degree of modulation of high-frequency modulation, i.e., (the average power after modulation) (power before modulation) is altered by the controller, the laser light emitting power (bottom power) subjected to no high-frequency modulation being thus controlled.

The controller which alters the degree of modulation of the high-frequency modulation is activated when a medium is inserted. Until the medium is ejected, the controller effects control so as to put the bottom power at the time of recording in a fixed range.

Furthermore, in accordance with the present invention, a recording/reproducing apparatus includes a laser for generating laser light to be used for recording/reproducing information onto/from a recording medium, a power control circuit for keeping an average output of the laser constant, a high-frequency adding circuit for applying high-frequency modulation to the laser, and a controller for altering the degree of modulation of the high-frequency modulation. When the average output of the laser is kept at a predetermined value by the power control circuit, the predetermined value is altered by the controller, the laser light emitting power (bottom power) subjected to no high-frequency modulation being thus controlled.

Furthermore, apart from a storage for holding a desired average output at the time of reproducing, i.e., a storage for holding a reproduction reference level, a storage for holding a desired average output at the time of recording, i.e., a storage for holding a recording reference level is provided. The recording reference level is altered by means for changing over between the reproduction reference level storage and the the recording reference level storage. The bottom power at the time recording operation is thus controlled.

Furthermore, the recording reference level held in the recording reference level storage is set when a medium is inserted, and it is held until the medium is ejected.

In accordance with the present invention, the laser light emission power (bottom power) without high-frequency modulation is maintained in a fixed range. Thereby, the thermal influence between recording marks disposed with a high density can be removed. As a result, precise recording mark edge control is made possible.

DESCRIPTION OF THE PREFERRED EMBODIMENTS

Hereafter, preferred embodiments of the present invention will be described in detail by referring to the drawing.

Figure 1:
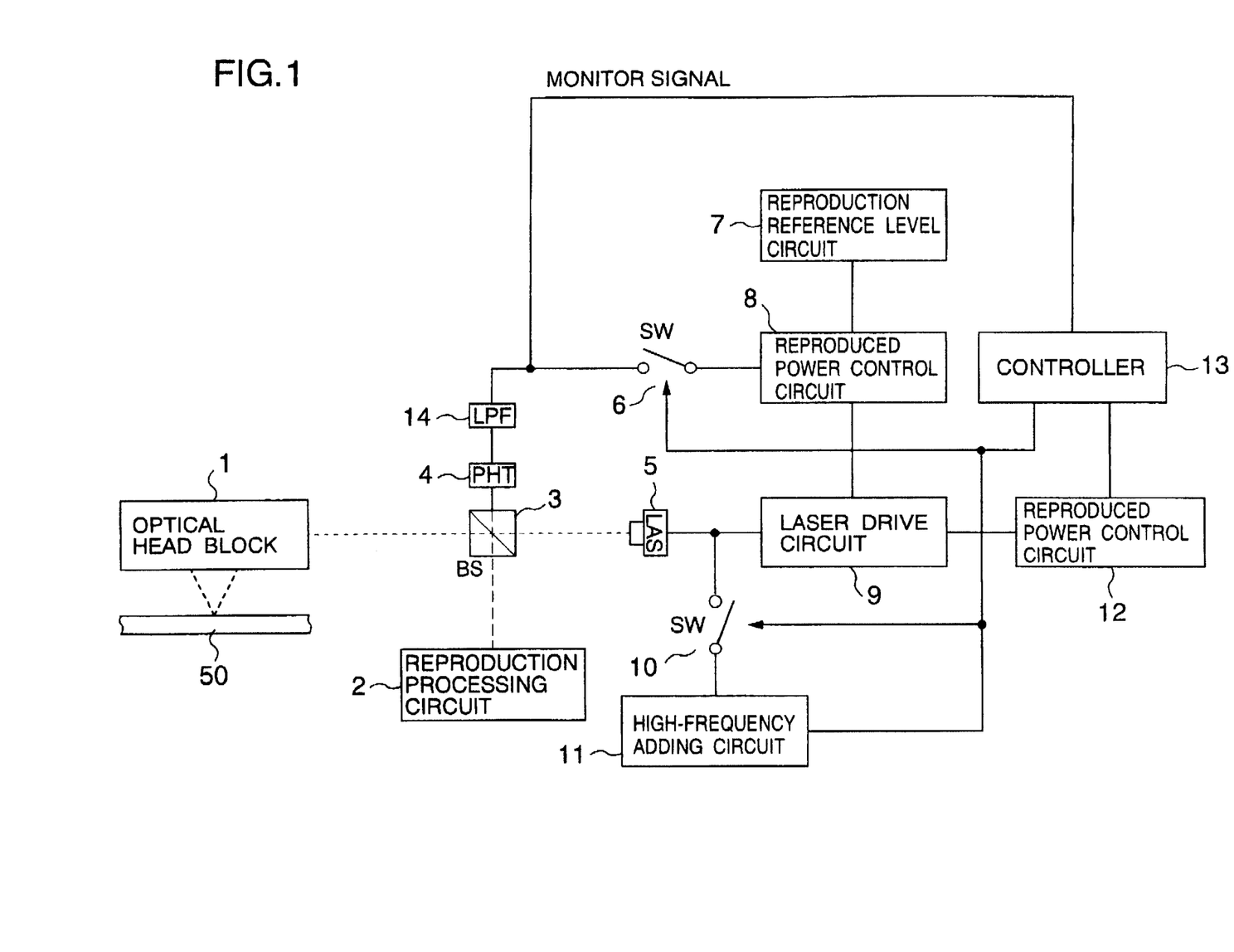
FIG. 1 is a diagram showing an example of an embodiment of an optical disk apparatus according to the present invention.
Figure 2:
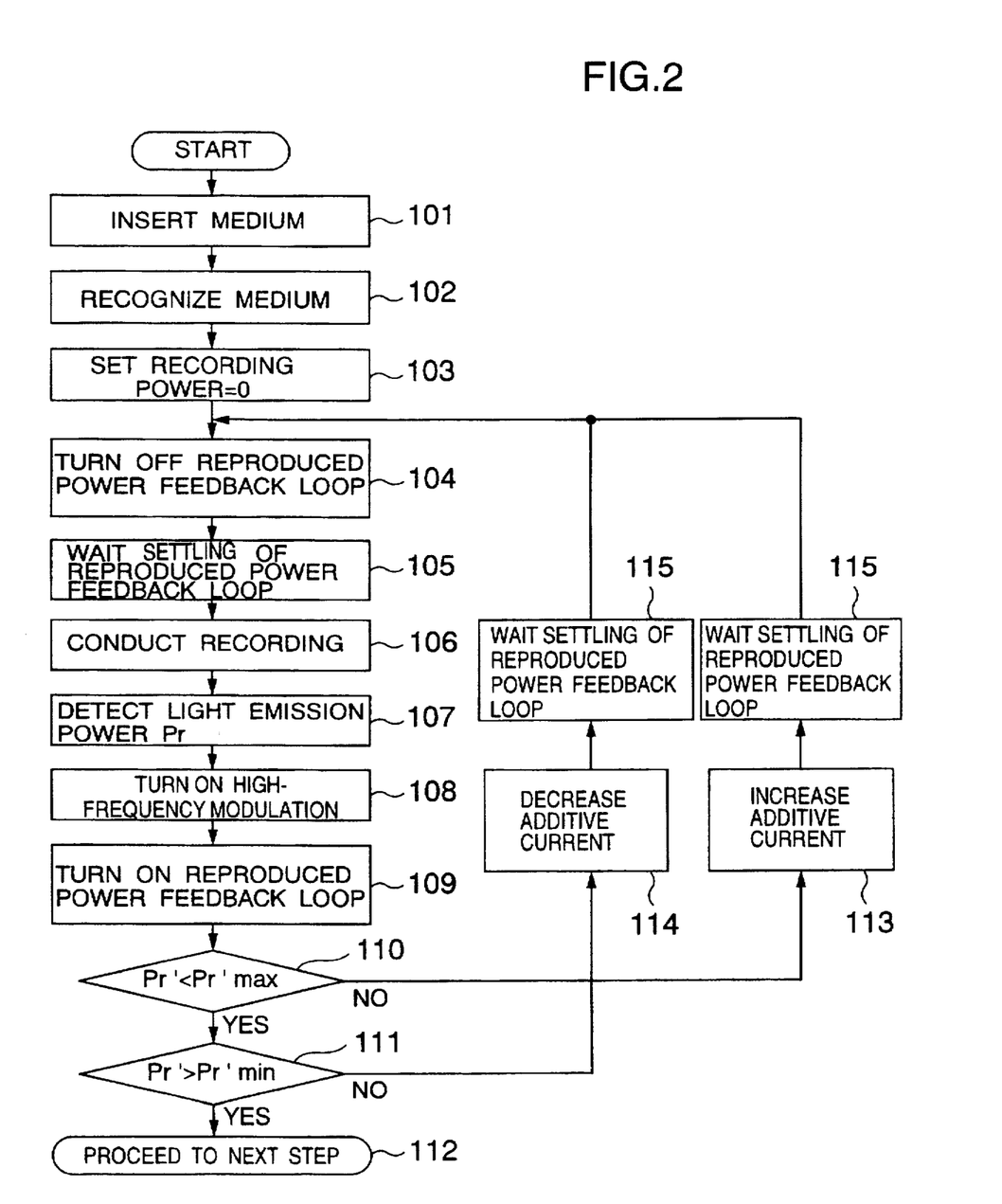
FIG. 2 is a flow chart showing an example of action in an embodiment of an optical disk apparatus control method according to the present invention.

FIG. 1 is a diagram showing an example of an embodiment of an optical disk apparatus according to the present invention. FIG. 2 is a flow chart showing an example of the operation of the embodiment of the optical disk apparatus.

In FIG. 1, numeral 1 denotes an optical head block for focusing light emitted from a laser and applying the focused light onto an optical disk medium 50. Numeral 2 denotes a reproduction processing circuit for electrically processing an optical signal reproduced from the optical head. Numeral 3 denotes a beam splitter for splitting the light emitted by the laser into light for monitoring and light for recording/reproducing, and for reflecting the optical signal supplied from the optical head toward a signal detection device. Numeral 4 denotes a photodetector for detecting a laser light emitting power monitoring signal. Numeral 5 denotes a semiconductor laser serving as a light source. Numeral 6 denotes a switch for switching on/off a feedback loop used to control the reproduced power so as to be constant. Numeral 7 denotes a reproduction reference level circuit for setting a desired point of the reproduced power level. Numeral 8 denotes a reproduced power control circuit for keeping the reproduced power constant. Numeral 9 denotes a laser drive circuit for driving the semiconductor laser. Numeral 10 denotes a switch for switching on/off a high-frequency additive current. Numeral 11 denotes a high-frequency adding circuit for outputting the high-frequency additive current to the laser. Numeral 12 denotes a recording power control circuit for controlling the laser power at the time of recording. Numeral 13 denotes a controller for controlling respective circuits. Numeral 14 denotes a low-pass filter for removing a high-frequency component from the output of the photodetector.

In the case of the present embodiment, the wavelength of the semiconductor laser is 680 nm. Assuming now that an optical disk 50 having a size of 5 inch and capable of recording data of 640 MB on both sides belongs to the first generation, an optical disk 50 having a storage capacity equivalent to three to four times of 640 MB belongs to the second generation, and an optical disk 50 having a storage capacity equivalent to six to eight times belongs to the third generation, the present invention is especially effective when it is used for the optical disk media having a high recording density of the second generation or later. At this time, the minimum diameter of a recording mark 51 formed on the optical disk medium 50 is approximately 0.68 μm.

In such a state that the reproduced light power is subjected to high-frequency modulation, its average power is kept at a fixed desired value. If the bottom power which is the direct current component thereof is low, therefore, the degree of modulation (which is equivalent to (average power)÷(bottom power)) of the high-frequency modulation is large. If the bottom power is high, the degree of modulation of the high-frequency modulation becomes small. If the degree of modulation of high-frequency modulation is adjusted by conversely using this phenomenon, the bottom power can be controlled. Based on this point, operation of the optical disk apparatus of the present embodiment will now be described by referring to a flow chart of FIG. 2.

The optical disk medium 50 is loaded in the apparatus (step 101). The apparatus recognizes the kind of the optical disk medium 50 (step 102). Thereafter, the controller 13 first sets power 0 in the recording power control circuit 12 (step 103). Subsequently, the controller 13 turns off the switch 6 and the switch 10, and stops the reproduced power feedback loop and high-frequency modulation (steps 104 and 105). Thereafter, the controller 13 conducts recording operation (step 106). Light emission power Pr' at that time is detected by the photodetector 4. Its level is recognized by the controller (step 107). Thereafter, the controller 13 turns on the switch 10 and the switch 6, and starts the reproduced power feedback loop and the high-frequency modulation (steps 108 and 109).

Thereafter, the controller 13 compares the power Pr' with an upper limit value Pr'max of the Pr' and a lower limit value Pr'min depending upon the recording density required for the optical disk medium 50 (steps 110 and 111). The controller 13 thus decides whether Pr' is within the desired range. If Pr' is larger than Pr'max, the controller 13 orders the high-frequency adding circuit 11 to increase the additive current (step 113). If Pr' is less than Pr'min, the controller 13 orders the high-frequency adding circuit 11 to decrease the additive current (step 114). Thereafter, the controller 13 waits settling of the reproduced power feedback loop (step 115), returns to step 104 for stopping the reproduced power feedback loop, and repeats the operation.

If the light emission power Pr' is within the predetermined range at the steps 110 and 111, then adjustment of the bottom power is finished and the controller 13 proceeds to the next step (step 112). Subsequently, normal recording and reproducing operation, for example, is conducted.

In the optical disk apparatus of the present embodiment, the optical disk medium 50 is loaded and an adjustment is effected so as to put the bottom power of the semiconductor laser 5 between Pr'min and Pr'max. When the recording marks 51 are formed on the optical disk medium 50 as exemplified in FIG. 5, therefore, edge portions 51a of individual recording marks 51 are prevented from being shifted unstably from desired solid line states to broken line states by variation of the bottom power. Thus, recording marks 51 can be formed precisely.

Figure 5:
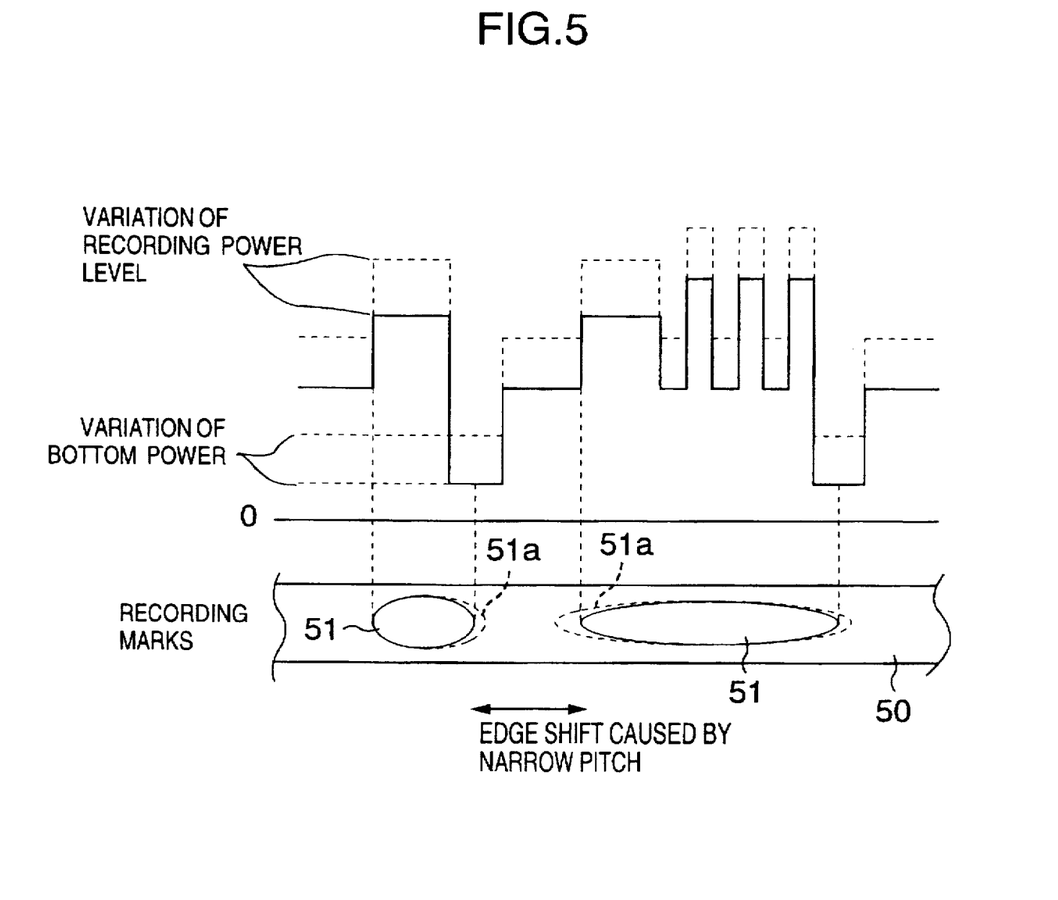
FIG. 5 is a concept diagram showing an example of the relation between the recording mark shape and the recording power in an optical disk medium.

Even when the pitch of a plurality of recording marks 51 disposed in the recording direction is shortened by an increase of information recording density, therefore, a disadvantage that edges 51a of adjacent recording marks 51 excessively get closer or overlap each other and discrimination becomes impossible is avoided. Thus it becomes possible to achieve a high recording density.

Figure 3:
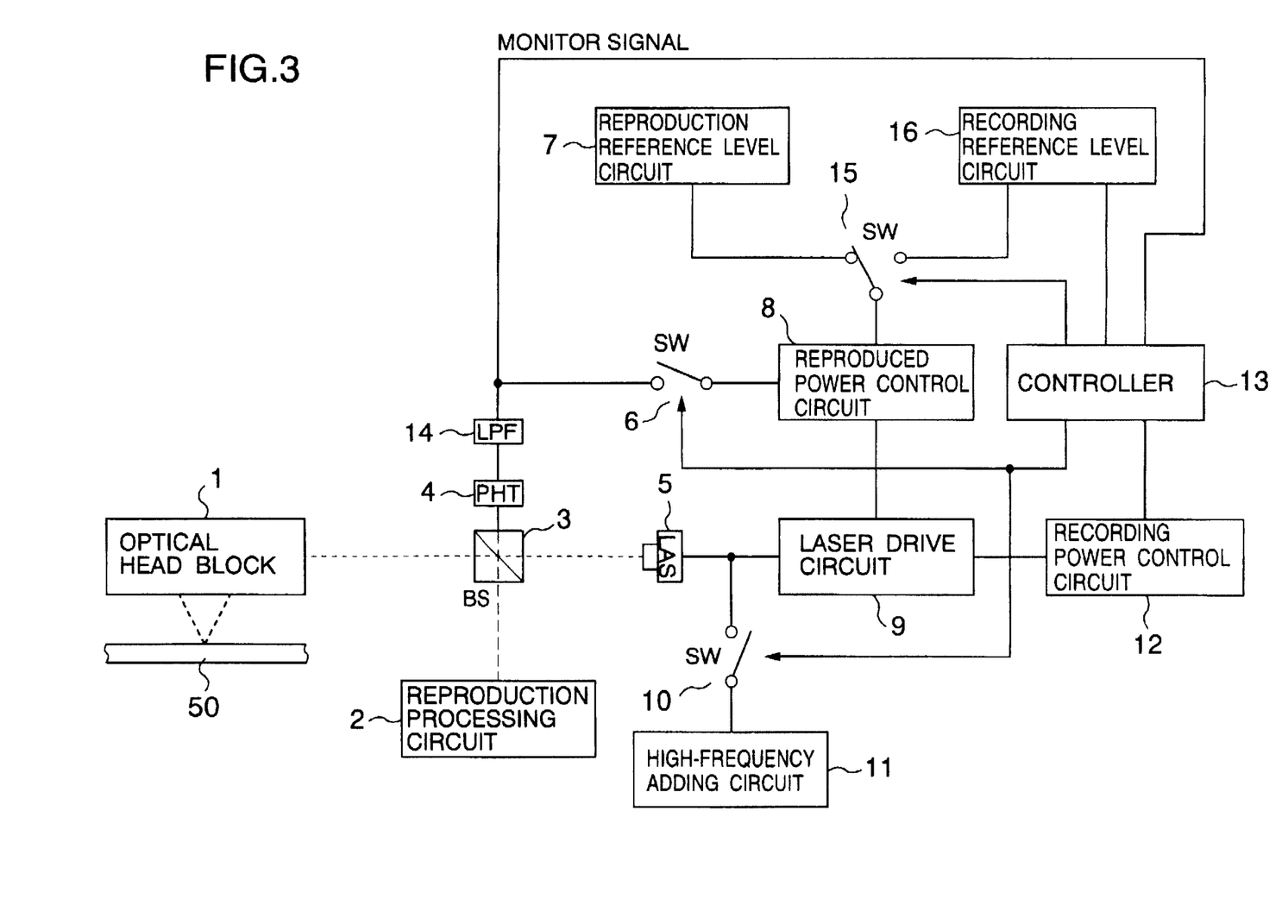
FIG. 3 is a diagram showing an example of another embodiment of an optical disk appartus according to the present invention.
Figure 4:
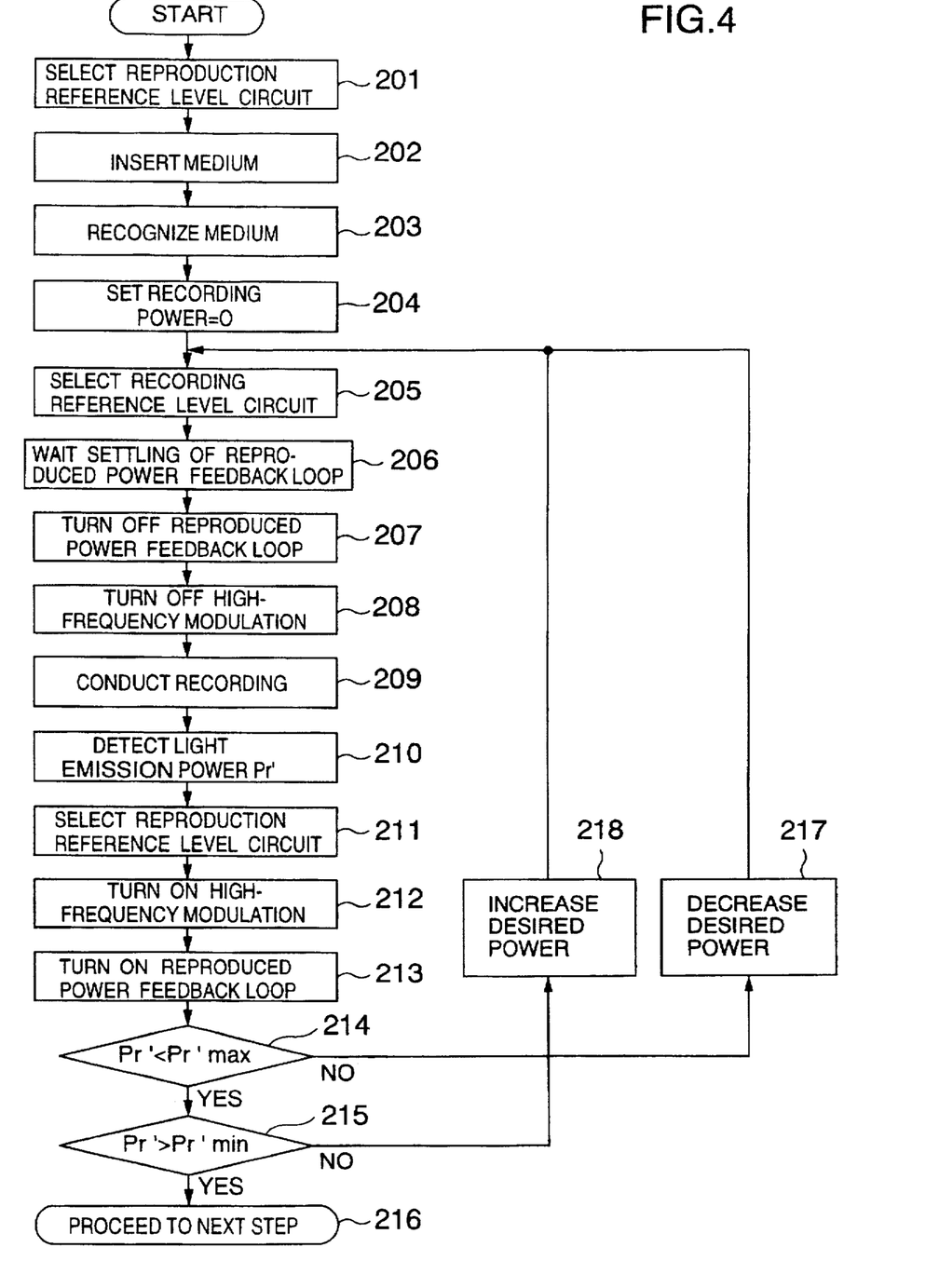
FIG. 4 is a flow chart showing an example of action in another embodiment of an optical disk apparatus control method according to the present invention.

FIG. 3 is a diagram showing an example of the configuration of an optical disk apparatus in which another embodiment of an optical disk apparatus control method according to the present invention is effected. FIG. 4 is a flow chart showing the operation of the optical disk apparatus of this embodiment.

In FIG. 3, numeral 1 denotes an optical head block for focusing light emitted from a laser and applying the focused light onto an optical disk medium 50. Numeral 2 denotes a reproduction processing circuit for electrically processing an optical signal reproduced from the optical head. Numeral 3 denotes a beam splitter for splitting the light emitted by the laser into light for monitoring and light for recording/reproducing, and for reflecting the optical signal supplied from the optical head toward a signal detection device. Numeral 4 denotes a photodetector for detecting a laser light emitting power monitoring signal. Numeral 5 denotes a semiconductor laser serving as a light source. Numeral 6 denotes a switch for switching on/off a feedback loop used to control the reproduced power so as to be constant. Numeral 7 denotes a reproduction reference level circuit for setting a desired point of the reproduced power level. Numeral 8 denotes a reproduced power control circuit for keeping the reproduced power constant. Numeral 9 denotes a laser drive circuit for driving the semiconductor laser. Numeral 10 denotes a switch for switching on/off a high-frequency additive current. Numeral 11 denotes a high-frequency adding circuit for outputting the high-frequency additive current to the laser. Numeral 12 denotes a recording power control circuit for controlling the laser power at the time of recording. Numeral 13 denotes a controller for controlling respective circuits. Numeral 14 denotes a low-pass filter for removing a high-frequency component from the output of the photodetector. Numeral 15 denotes a switch for switching over between a desired power level point at the time of reproducing and a desired power level point at the time of recording. Numeral 16 denotes a recording reference level circuit for setting a desired point of bottom power at the time of recording.

In such a state that the reproduced light power is subjected to high-frequency modulation, its average power is kept at a fixed desired value by the reproduced power feedback loop. However, if the degree of modulation (which is equivalent to (average power)÷(bottom power)) of the high-frequency modulation is fixed and the desired value of the reproduced light power is made small at the time of recording, the bottom power which is the direct current component thereof becomes small. Based on this point, operation of the optical disk apparatus of the present embodiment will now be described by referring to a flow chart of FIG. 4.

The switch 15 is connected to the side of the reproduction reference level circuit 7. Thereby the reproduction reference level circuit 7 is selected (step 201). In this state, the optical disk medium 50 is loaded in the apparatus (step 202). The apparatus recognizes the kind of the optical disk medium 50 (step 203). Thereafter, the controller 13 first sets power 0 in the recording power control circuit 12 (step 204). Subsequently, the controller 13 changes over the switch 15 to the side of the recording reference level circuit 16 and thereby selects the recording reference level circuit 16 (step 205). The controller 13 waits for stabilization of the reproduced power feedback loop (step 206). Thereafter, the controller 13 turns off the switch 6 and the switch 10, and stops the reproduced power feedback loop and high-frequency modulation (steps 207 and 208). Thereafter, the controller 13 conducts recording operation (step 209). Light emission power Pr' at that time is detected by the photodetector 4. Its level is recognized by the controller (step 210). Thereafter, the controller 13 changes over the switch 15 to the side of the the reproduction reference level circuit 7 and thereby selects the reproduction reference level circuit 7 (step 211). Thereafter, the controller 13 turns on the switch 10 and the switch 6, and starts the high-frequency modulation and the reproduced power feedback loop (steps 212 and 213).

Thereafter, the controller 13 compares Pr' with its upper limit value Pr'max and its lower limit value Pr'min and decides whether Pr' is within the desired range (steps 214 and 215). If Pr' is larger than Pr'max, the controller 13 orders the recording reference level circuit 16 to decrease the desired power (step 217). If Pr' is less than Pr'min, the controller 13 orders the recording reference level circuit 16 to increase the desired power (step 218). Thereafter, the controller 13 returns to step 205 for selecting the recording reference level circuit 16, and repeats the above described series of operations.

If it is found by the decision at the steps 214 and 215 that the value of Pr' is within the range defined by the upper limit value Pr'max and the lower limit value Pr'min, adjustment of the bottom power is finished and the controller 13 proceeds to the next step (step 216), and conducts normal recording and reproducing operation, for example.

In the case where the bottom power is corrected by using the method of this embodiment, the correction result is held in the recording reference level circuit 16. Immediately before the recording operarion, therefore, the controller 13 changes over the switch 15 to the side of the recording reference level circuit 16. Immediately after the recording operation, the controller 13 returns the switch 15 to the side of the reproduction reference level circuit 7. Thereby, an adjustment is effected so as to put variation of the bottom power caused by the return light of the semiconductor laser 5 between Pr'min and Pr'max. When information is recorded by forming the recording marks 51 on the optical disk medium 50 as exemplified in FIG. 5, therefore, edge portions 51a of individual recording marks 51 are prevented from being shifted unstably from desired solid line states to broken line states by variation of the bottom power as represented by solid lines and broken lines. Thus, recording marks 51 can be formed precisely.

Even when the pitch of a plurality of recording marks 51 disposed in the recording direction is shortened by, for example, an increase of information recording density on the optical disk medium 50, therefore, a disadvantage that edges 51a of adjacent recording marks 51 excessively get closer or overlap each other and discrimination becomes impossible is avoided. Thus it becomes possible to achieve a high recording density.

The invention effected by the present inventors has heretofore been described concretely by referring to embodiments. However, it is a matter of course that the present invention is not limited to the above described embodiments, but various changes can be effected without departing from the spirit thereof.

An optical disk apparatus of the present invention provides an effect that the dispersion of the edge shape and arrangement pitch of recording marks caused by variation of the bottom power can be suppressed and information can be recorded on an optical disk medium with a high density.

An optical disk apparatus control method of the present invention provides an effect that the dispersion of the edge shape and arrangement pitch of recording marks caused by variation of the bottom power can be suppressed and information can be recorded on an optical disk medium with a high density.

We claim:

1. An optical information recording and reproducing control apparatus including a laser source for oscillating a laser light to record and reproduce information to and from a recording medium, a power monitor for monitoring a power of the laser light from the laser source, a high-frequency adding circuit for modulating the laser light in high frequency, a first power control circuit for holding a mean value of a laser output having a bottom power by a direct current component and a modulation component by the high-frequency adding circuit at a predetermined value by an output of the power monitor, a second power control circuit for setting a recording power to be added to the bottom power, and a controller for controlling the first power control circuit, the second power control circuit and the high-frequency adding circuit, wherein the controller sets the recording power set by the second power control circuit to zero; makes "off state" control of the mean value of the laser output controlled by the first power control circuit and the high frequency modulation of the laser light by the high-frequency adding circuit; emits the laser light by the bottom power to monitor the laser output by the power monitor; and checks whether or not the output of the power monitor is present in a predetermined range.

2. An optical information recording and reproducing control apparatus according to claim 1, wherein the controller issues commands for emitting the laser in the bottom power.

3. An optical information recording and reproducing control apparatus according to claim 1, wherein the controller starts to control the mean value of the laser output by the first power control circuit and modulates the laser light in high frequency by the high-frequency adding circuit after carrying out a recording operation and monitoring the laser output by the power monitor; increases an adding current by the high-frequency adding circuit if the output of the power monitor is larger than an upper limit value in the predetermined range; decreases the adding current if the output of the power monitor is smaller than a lower limit value in the predetermined range; controls the mean value of the laser output to be a predetermined output by the first power control circuit; and makes again "off state" the control of the mean value of the laser output by the first power control circuit and the high frequency modulation of the laser light by the high-frequency adding circuit to monitor the laser output.

4. An optical information recording and reproducing control apparatus according to claim 1, wherein the controller monitors the laser output upon insertion of the recording medium.

5. An optical information recording and reproducing control method of an apparatus including a laser source for oscillating a laser light to record and reproduce information to and from a recording medium, a power monitor for monitoring a power of the laser light from the laser source, a beam splitter for splitting a luminous flux of the laser light for monitoring, a light receiving element for receiving the luminous flux, a high-frequency adding circuit for modulating the laser light in high frequency, a first power control circuit for holding a mean value of a laser output having a bottom power by a direct current component and a modulation component by the high-frequency adding circuit at a predetermined value by an output of the light receiving element, a second power control circuit for setting a recording power added to the bottom power with the high-frequency adding circuit and the control of the mean value by the first power control circuit made "off state", and a controller for changing an adding current by the high-frequency adding circuit, comprising the steps of:

(a) setting the recording power set by the second power control circuit to zero after inserting the recording medium;

(b) making "off state" an output to the first power control circuit caused by the output of the light receiving element and the high frequency modulation of the laser light;

(c) performing emission of the laser light by the bottom power to monitor the laser output by the power monitor;

(d) starting control of the mean value of the laser output by the first power control circuit and the high frequency modulation of the laser light by the high-frequency adding circuit;

(e) performing ordinary recording and reproducing operations in case where the power of the laser light by the power monitor is present in a predetermined range;

(f) increasing the adding current in case where the output by the power monitor is larger than an upper limit value in the predetermined range;

(g) decreasing the adding current in case where the output by the power monitor is smaller than a lower limit value in the predetermined range;

(h) controlling the mean value of the laser output to make it a predetermined output by the first power control circuit in case where a magnitude of the modulation has been changed and returning to step (b).

6. An optical information recording and reproducing control apparatus including a laser source for oscillating a laser light to record and reproduce information to and from a recording medium, a power monitor for monitoring a power of the laser light from the laser source, a high-frequency adding circuit for modulating the laser light in high frequency, a first power control circuit for holding a mean value of a laser output at a predetermined value by the output of the power monitor, a storage unit for storing the predetermined value held in the first power control circuit unless control for the high-frequency adding circuit and the mean value of the laser output by the output of the power monitor is performed, a second power control circuit for setting a recording power to be added to the predetermined value by the storage unit and the first power control circuit, a controller for controlling the first power control circuit, the second power control circuit and the high-frequency adding circuit, wherein the controller sets the recording power set by the second power control circuit to zero; makes "off state" the control of the mean value of the laser output in the first power control circuit by a first switch; makes "off state" the high frequency modulation of the laser light in the high frequency adding circuit by a second switch; emits the laser light by a bottom power to monitor the laser output by the power monitor; and checks whether or not the output of the power monitor is present in a predetermined range.

7. An optical information recording and reproducing control apparatus according to claim 6, wherein the controller issues commands for emitting the laser in the bottom power.

8. An optical information recording and reproducing control apparatus according to claim 6, wherein the controller controls the storage unit; starts to control the mean value of the laser output by the first power control circuit and modulates the laser light in high frequency by the high-frequency adding circuit after performing a recording operation and monitoring the laser output by the power monitor; changes the predetermined value in case where the output by the power monitor is absent in the predetermined range; controls the mean value of the laser output by the first power control circuit to make it a predetermined output; and makes again "off state" the control of the mean value of the laser output by the first power control circuit and the high frequency modulation of the laser light by the high-frequency adding circuit to monitor the laser output.

9. An optical information recording and reproducing control apparatus including a laser source for oscillating a laser light to record and reproduce information to and from a recording medium; a power monitor for monitoring a power of the laser light from the laser source; a high-frequency adding circuit for modulating the laser light in high frequency; a first storage unit for holding a first target value; a second storage unit for holding a second target value; a switch for selecting one of the first and second storage units; a first power control circuit for holding a mean value of a laser output at the first target value by an output of the power monitor when the first storage unit is selected by the switch and the mean value of the laser output at the second target value when the second storage unit is selected by the switch; a second power control circuit for setting a recording power to be added to the second target value in the first power control circuit; and a controller for controlling the first power control circuit, the second power control circuit, the second storage unit, the high-frequency adding circuit and the switch, wherein the controller sets the recording power in the second power control circuit to zero; makes the switch to select the second storage unit; makes "off state" the control of the mean value of laser output in the first power control circuit; makes "off state" the high frequency modulation of the laser light by the high-frequency adding circuit; emits the laser light at a recording power in response to the second target value to monitor the laser output by the power monitor; and checks whether or not the output of the power monitor is present in a predetermined range.

10. An optical information recording and reproducing control apparatus according to claim 9, wherein the controller issues commands for emitting the laser in the bottom power.

11. An optical information recording and reproducing control apparatus according to claim 9, wherein the controller starts to control the mean value of the laser output by the first power control circuit and modulates the laser light in high frequency by the high-frequency adding circuit after carrying out a recording operation and monitoring the laser output by the power monitor; changes the second target value to a predetermined value if the output of the power monitor is absent in the predetermined range; controls the mean value of the laser output in the first power control circuit to make it a predetermined output; and makes again "off state" the control of the mean value of the laser output in the first power control circuit and the high frequency modulation of the laser light by the high-frequency adding circuit to monitor the laser output.

12. An optical information recording and reproducing control apparatus according to claim 9, wherein the controller monitors the laser output upon insertion of the recording medium.

13. An optical information recording and reproducing control method of an apparatus including a laser source for oscillating a laser light to record and reproduce information to and from a recording medium; a power monitor for monitoring a power of the laser light from the laser source; a beam splitter for splitting a luminous flux for monitoring; a high-frequency adding circuit for modulating the laser light in high frequency; a first storage unit for holding a first target value; a second storage unit for holding a second target value; a switch for selecting one of the first and second storage units; a first power control circuit for holding a mean value of a laser output at the first target value by an output of the power monitor when the first storage unit is selected by the switch and the mean value of the laser output at the second target value when the second storage unit is selected by the switch; a second power control circuit for setting a recording power to be added to the second target value in the first power control circuit; and a controller for changing a magnitude of the modulation of the high frequency modulation and the second target value, comprising the steps of:

(a) selecting the second target value to set an output of the second power control circuit to "0" after inserting the recording medium;

(b) making "off state" an output to the first power control circuit and the high frequency modulation of the laser light by the high-frequency adding circuit;

(c) emitting a laser light in a bottom power to monitor a laser output by the power monitor;

(d) selecting the first target value by the switch to start the output to the first power control circuit and the high frequency modulation of the laser light by the high-frequency adding circuit;

(e) carrying out ordinary recording and reproducing operations in case where the output of the power monitor is present in a predetermined range;

(f) decreasing the second target value in case where the output of the power monitor is larger than an upper limit value in the predetermined range;

(g) increasing the second target value in case where the output of the power monitor is smaller than a lower limit value in the predetermined range; and (h) selecting the second target value by the switch in case of changing the second target value and returning to step (b).

* * * * *